United States Patent [19]

Sato

[11] 4,375,350

[45] Mar. 1, 1983

[54] APPARATUS FOR FORMING ELONGATED SYNTHETIC RESIN PLATE OR SHEET

[75] Inventor: Toshio Sato, Otsu, Japan

[73] Assignee: Sakushin Kogyo Co., Ltd., Kyoto, Japan

[21] Appl. No.: 329,926

[22] Filed: Dec. 11, 1981

[30] Foreign Application Priority Data

Dec. 29, 1980 [JP] Japan .................................. 55-187705

[51] Int. Cl.³ ............................ B30B 5/06; B29D 7/14
[52] U.S. Cl. ..................................................... 425/371
[58] Field of Search ......................................... 425/371

[56] References Cited

U.S. PATENT DOCUMENTS

| | | | |
|---|---|---|---|
| 3,942,927 | 3/1976 | De Mets | 425/371 X |
| 3,942,929 | 3/1976 | De Mets | 425/371 X |
| 3,994,648 | 11/1976 | Kornylak et al. | 425/371 X |
| 4,002,114 | 1/1977 | Guttinger | 425/371 X |
| 4,008,030 | 2/1977 | Ampler | 425/371 X |
| 4,043,719 | 8/1977 | Jones | 425/371 X |
| 4,213,748 | 7/1980 | Ahsweiler | 425/371 |
| 4,216,179 | 8/1980 | Lamberts et al. | 425/371 X |

Primary Examiner—J. Howard Flint, Jr.
Attorney, Agent, or Firm—Birch, Stewart, Kolasch & Birch

[57] ABSTRACT

An improved apparatus for forming an elongated synthetic resin plate or sheet, is provided. The lower steel belt of the apparatus is placed on a lower board and is intermittently fed by a predetermined distance. Side frames are installed on the lower steel belt, the side frames stretching on both the right and left edges of the lower steel belt in the lengthwise direction thereof. The upper steel belt is disposed between the two side frames, and an upper board is installed on the upper steel belt. Either one of the upper board or the lower board is so constructed as to be movable up and down. The resinous starting material is pressed by the pressing operation of the board which moves up and down via the upper and lower steel belts. The upper and lower boards are divided into a plurality of blocks so as to correspond to the opposing ones, thereby to constitute heating zones having heating means and cooling zones having cooling means.

22 Claims, 11 Drawing Figures

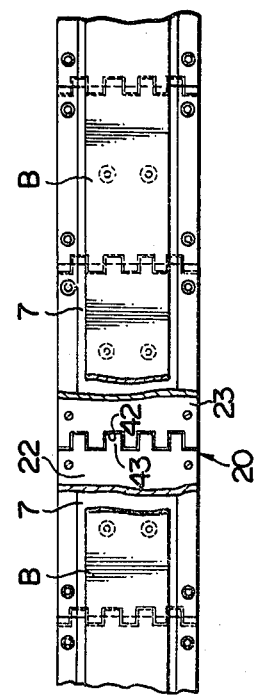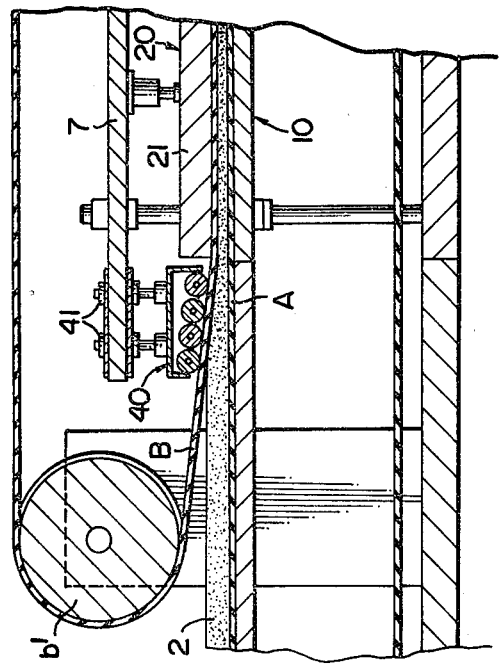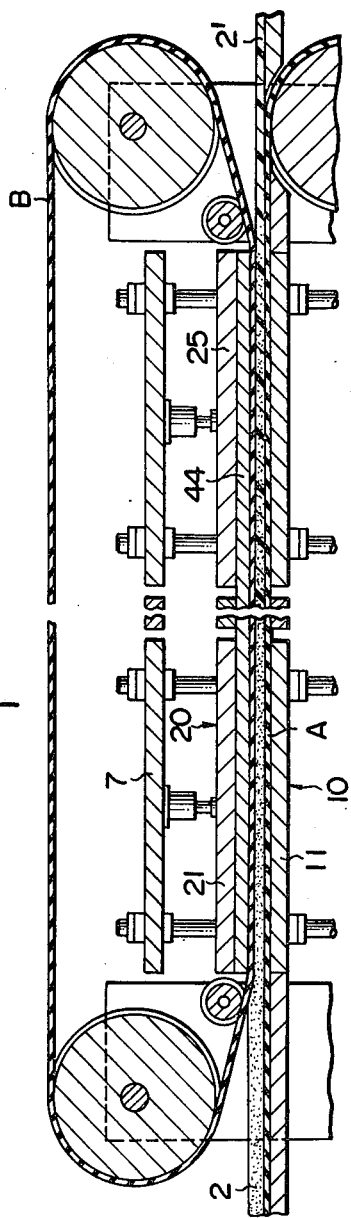

APPARATUS FOR FORMING ELONGATED SYNTHETIC RESIN PLATE OR SHEET

BACKGROUND AND SUMMARY OF THE INVENTION

The present invention relates to an apparatus for forming an elongated synthetic resin plate or sheet.

The method of forming a synthetic resin plate can generally be divided into a press method according to which a granular or powdery resinous starting material is introduced to between molding plates or into a box-like metal mold, and is heated and cooled under the application of pressure, and an extrusion method according to which a metal mold having an oblong shape in cross section is connected to an extruder, and a molten resinous starting material is continuously extruded by the extruder through the metal mold, followed by cooling. With the former press method, the heating and cooling are repetitively performed, wasting large amounts of heat. To produce elongated synthetic resin plates or sheets, furthermore, the products formed by pressing must be connected by welding. Therefore, the press method requires increased number of manufacturing steps, increased labor, and results in inefficient produceability. With the latter extrusion method on the other hand, residual strain builds up in the resinous raw material in the direction of extrusion, the resulting products find very limited applications, and further, the metal molds must be provided according to thicknesses of the products. The extrusion method therefore requires tremendous costs.

There has also been proposed an improved molding method of the type which utilizes double steel belts, in which the resinous starting material of which the thickness is adjusted to a predetermined thickness is supplied to between the upper steel belt and the lower steel belt, and the resinous material is heated under the application of pressure via the steel belts, followed by cooling.

The above method is an improvement of the aforementioned press method, and is effective for improving the produceability. The press mechanism for pressing the resinous starting material employed by this method consists of heating and cooling rollers that are rotatably arrayed on the steel belt, in order to press the starting material as the rollers rotate on the belt.

With this method in which the steel belt is heated or cooled by the rollers, however, the rollers and the steel belt come into line contact. In other words, the contacting areas are very small, and the heat conductivity is small. Further, it is technically difficult to apply high pressure onto the resinous starting material from the rollers via steel belt. Accordingly, the above improved method is capable of producing only limited kinds of products such as foamed resin plates.

Moreover, since there is no member that defines the right and left sides of the steel belt, the side edges of the raw material collapses when the resinous raw material is heated and melted in the heating zone, resulting in losses of raw material. Further, since the product has no definite width, selvages must be cut away in a subsequent step.

The object of the present invention is to provide an apparatus for forming a synthetic resin plate or sheet having any desired thickness, in which the heat conductivity to the double steel belts is increased. The increased pressure is exerted on the resinous starting material, and members that define the right and left sides of the steel belt are provided to reduce losses of the staring materials and to increase the operation efficiency, while eliminating the aforementioned defects inherent in the conventional double steel belt-type molding method.

The molding apparatus of the present invention is characterized in that the lower steel belt is placed on a lower board and is intermittently fed by a predetermined distance. Side frames are installed on the lower steel belt, the side frames stretching on both the right and left edges of the lower steel belt in the lengthwise direction thereof. The upper steel belt is disposed between said two side frames, an upper board is installed on the upper steel belt, either one of the upper board or the lower board is so constructed as to move up and down. The resinous starting material is pressed by the pressing operation of the board which moves up and down via the upper and lower steel belts, and the upper and lower boards are divided into a plurality of blocks so as to correspond to the opposing ones, thereby constituting heating zones having heating means and cooling zones having cooling means.

The upper board may be constructed to be movable so that the pressing operation is performed when it lowers, or the lower board may be constructed to be movable so that the pressing operation is performed when it rises.

The heating zone may be composed of a single block in which the pressing force and the heating temperature are maintained constant. Preferably, however, the heating zone should be composed of a plurality of blocks having different pressing forces and heating temperatures. It is also allowable to provide a heat-insulating block for maintaining the ripened condition of the resinous starting material.

The cooling zone is also made up of a single block or a plurality of blocks having different pressing forces and cooling temperatures.

As required, the plurality of blocks forming the boards should be arrayed maintaining a suitable gap relative to each other. This helps prevent the steel belts from being folded at acute angles by the boards and stepped portions that develop among the neighboring blocks due to the thermal expansion or contraction of the starting material being caused by the temperature differential, and hence, the steel belts are protected from being damaged or broken.

When the upper or lower moving board has finished the pressing operation, the lower steel belt is moved by one block to transfer the resinous starting material to the next block. The upper steel belt, however, may be maintained stationary or, preferably, be moved by a distance of the same block in synchronism with the lower steel belt.

Side frames prevent the right and left side edges of the resinous raw material from being collapsed. Under the condition in which the resinous raw material is compressed by the moving board, the moving board or the upper steel belt should be in sliding contact with the inner surfaces of the side frames, since the pressing mold is established by the side frames and the board or the steel belt. A good fitting condition is obtained by the moving board and the side frames; the upper steel belt is arrayed by maintaining a slight gap relative to the side frames so that it can be smoothly transferred.

The right and left side frames should be provided by maintaining a small gap relative to the lower steel belt, so that the lower steel belt can be smoothly transferred.

For this purpose, the side frames should be so supported on the lower board so as to move up and down, and should protrude onto the lower steel belt. Further, springs should be interposed between the board and the side frame thereby to maintain a small gap between the steel belt and the side frames.

Although a small gap is formed between the side frames and the lower steel belt, the moving board moves up or down during the pressing operation to close the small gap; therefore, the resinous starting material does not leak.

For this purpose, the side frames should be forcibly pressed onto the lower board via the lower steel belt before the resinous starting material is being compressed.

The side frames can be effectively lowered by a knock pin or a spring incorporated in the upper board.

BRIEF DESCRIPTION OF THE DRAWINGS

The invention will now be described in greater detail on the basis of a preferred embodiment having an upper board which moves up and down and a stationary lower board, in conjunction with the drawing, in which:

FIGS. 9 to 11 illustrate modified embodiments of the present invention, in which FIG. 9 is a sectional side view illustrating a starting end of the upper steel belt;

FIG. 10 is a partly cut-away plan view illustrating the moving board; and

FIG. 11 is a sectional side view of the upper steel belt.

DETAILED DESCRIPTION OF THE INVENTION

Figure 2:
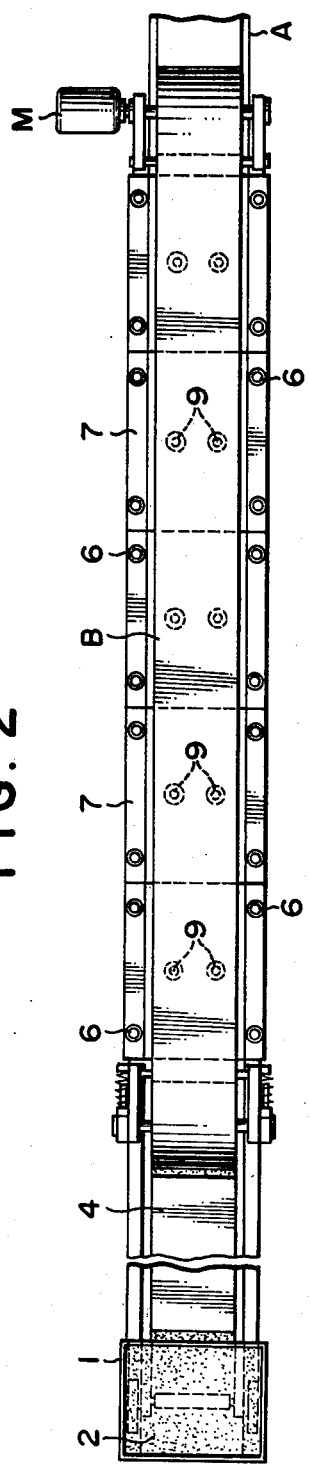
FIG. 2 is a plan view.
Figure 1:
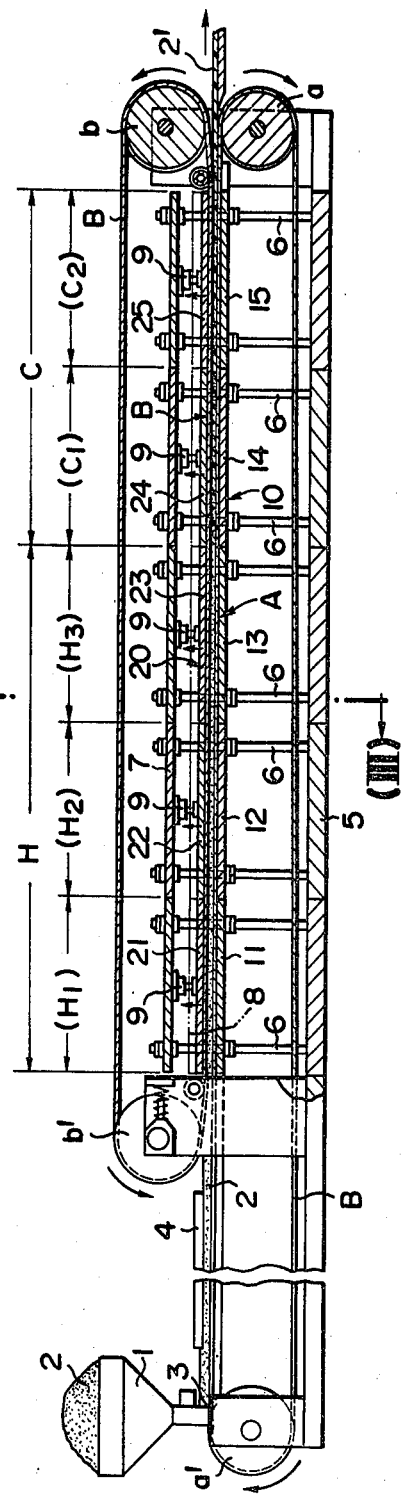
FIG. 1 is a sectional side view of an apparatus of the present invention.

In FIGS. 1 and 2, symbol A denotes a lower steel belt, B denotes an upper steel belt, and a, a' and b, b' denote pulleys. The lower steel belt A runs endlessly between the pulleys a and a', and the upper steel belt B runs endlessly between the pulleys b and b'. The pulley a is driven by a drive motor M, and the pulley b is also driven in synchronism therewith, thereby to intermittently feed the two steel belts A and B.

The starting end (left end in the drawing) of the lower steel belt A protrudes beyond the upper steel belt B, and a hopper 1 for supplying the raw material is installed on the starting end. The resinous starting material 2 is allowed to fall from the hopper 1 onto the steel belt A, and is supplied to between the two steel belts A and B.

The resinous starting material 2 is a powdery or a granular thermoplastic resin such as polyethylene or propylene, and the feeding rate is determined by a doctor knife 3 provided in the outlet port of the hopper 1.

An infrared-ray preheating device 4 is installed on the lower steel belt A between the hopper 1 and the upper steel belt B, so that the resinous starting material 2 supplied from the hopper 1 is preheated before it is supplied to between the two steel belts A and B.

A fixed board 10 consisting of five blocks 11, 12, 13, 14 and 15, is installed flush beneath the lower surface of the lower steel belt A so that the lower steel belt A is intermittently transferred adjacent to the upper surface of the board 10.

Figure 5:
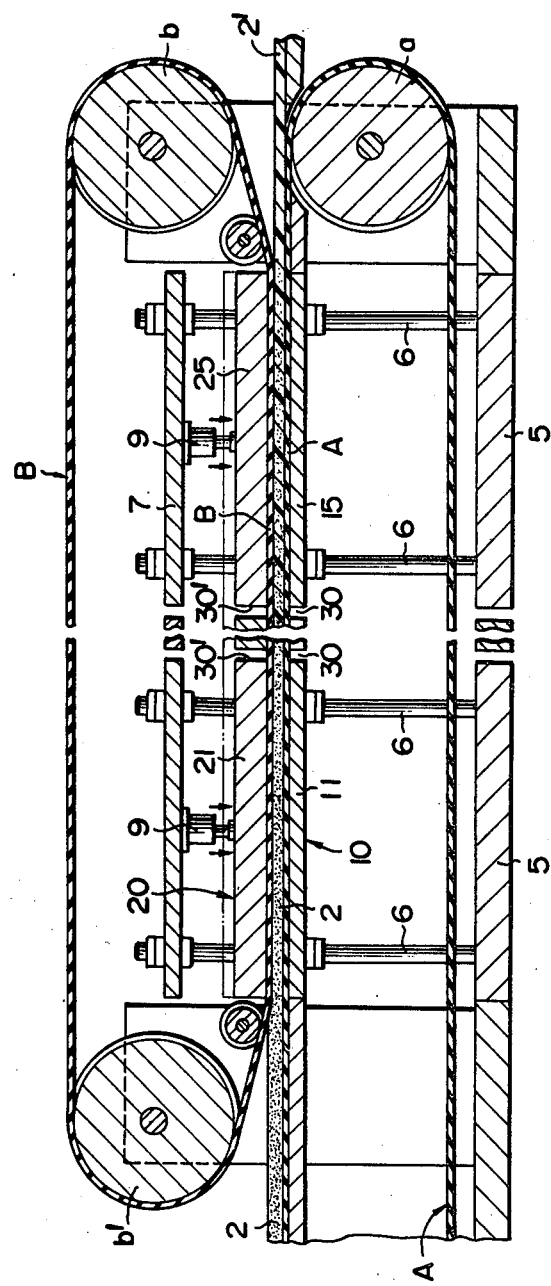
FIG. 5 is a sectional side view illustrating the pressed state (in the heating and cooling portions)
Figure 6:
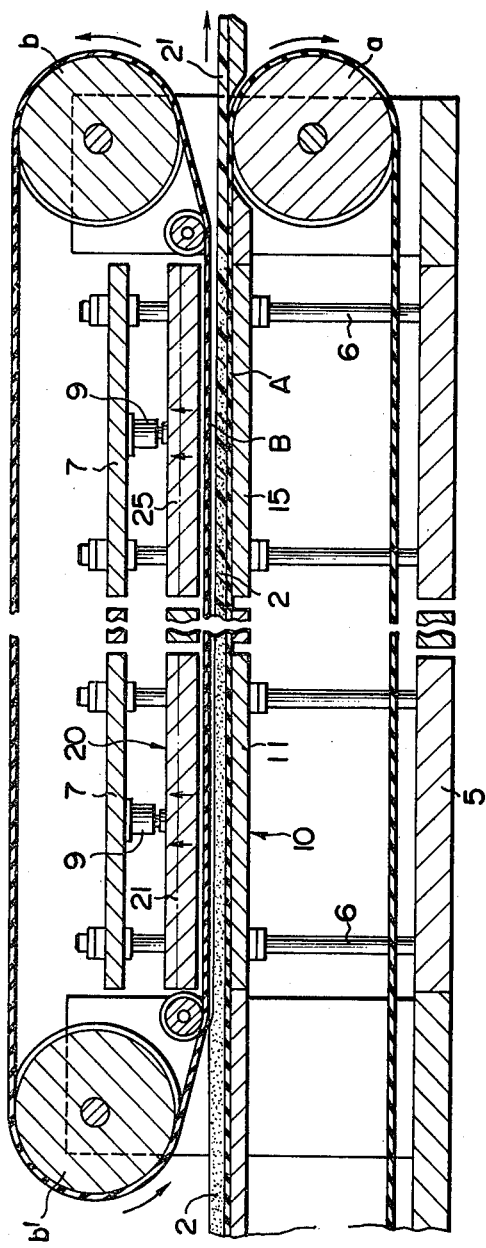
FIG. 6 is a sectional side view of the apparatus when the starting material is being transferred.

The blocks 11, 12, 13, 14 and 15 are secured by poles 6, 6 erected on a base frame, and a suitable gap 30 is maintained between the neighboring blocks 11 and 12, 12 and 13, 13 and 14, 14 and 15 (FIGS. 5 and 6).

The individual poles 6, 6, - - - rise to a point between the upper side and the lower side of the upper steel belt B, and have a top board 7 that is secured sideways to penetrate between the upper side and the lower side of the steel belt B.

Figure 3:
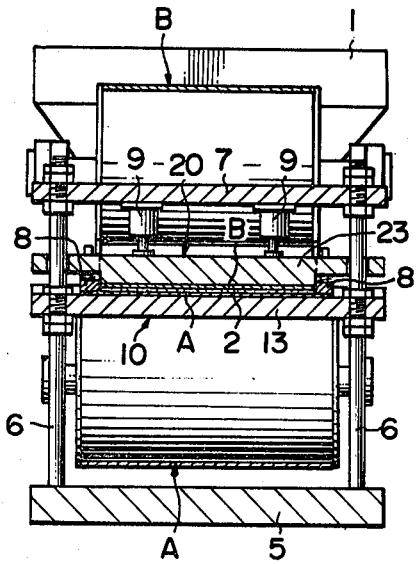
FIG. 3 is a section view along the line III—III of FIG. 1.
Figure 4:
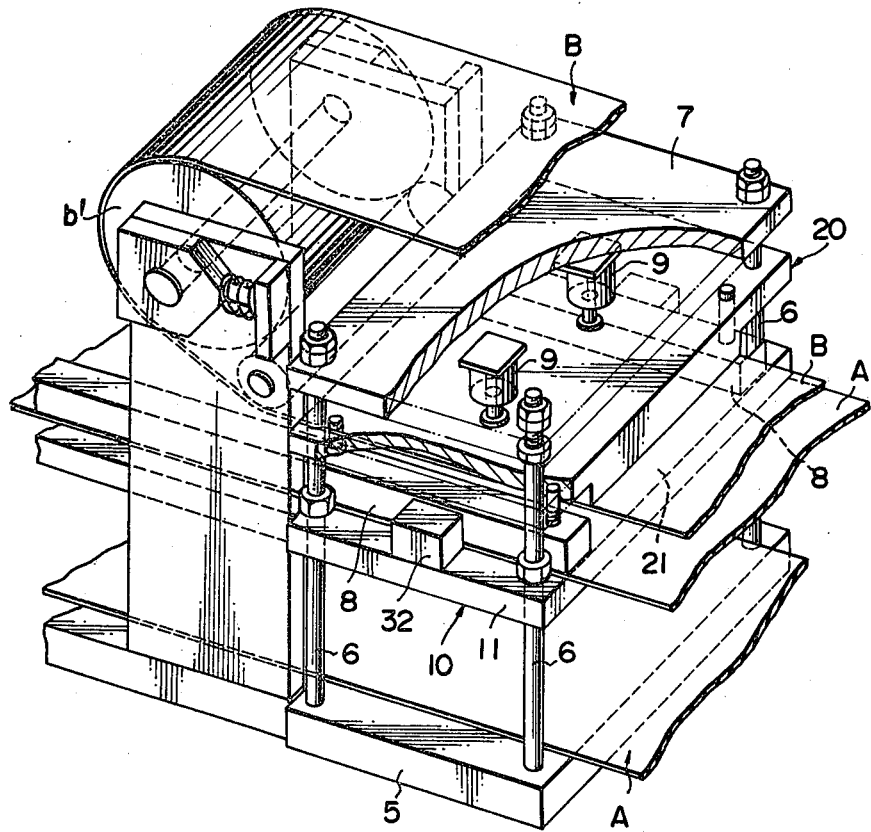
FIG. 4 is a partly cut-away perspective view of major portions.

Side frames 8, 8 are provided adjacent to the right and left edges of the lower steel belt A to stretch in the lengthwise direction thereof, and the upper steel belt B (lower side of the belt B) is disposed between the two side frames 8 and 8 (FIG. 3).

A moving board 20 consisting of five blocks 21, 22, 23, 24 and 25, is provided adjacent to the upper steel belt B. The individual blocks 21, 22, 23, 24 and 25 are supported by the poles 6, 6, - - - to move up and down maintaining a gap 30 between the neighboring blocks 21 and 22, 22 and 23, 23 and 24, and 24 and 25. The blocks 21, 22, 23, 24 and 25 of the moving board 20 are hung from the top boards 7 via rods of hydraulic cylinders 9, 9, - - - that are fastened to the top boards 7, and are simultaneously moved upwards or downwards by the hydraulic cylinders 9, 9, - - - .

Figure 7:
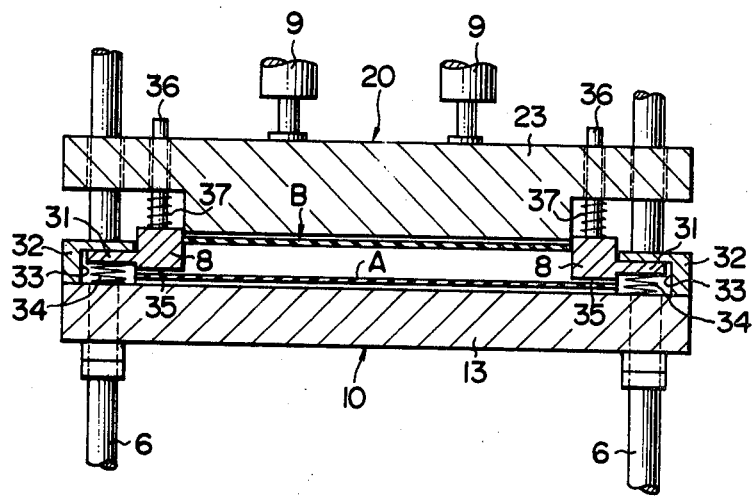
FIG. 7 is a view illustrating on an enlarged scale, a major portion of FIG. 3.

The side frames 8, 8 have outwardly protruding support arms 31 that are slidably fitted into a guide hole 33 of a support member 32 fastened onto the fixed board 10, so as to move in the upper and lower directions. Further, springs 34 are interposed under the support arms 31 to urge them upwardly whereby the side frames 8 are installed maintaining a small gap 35 on the lower steel belt A (FIG. 7).

Figure 8:
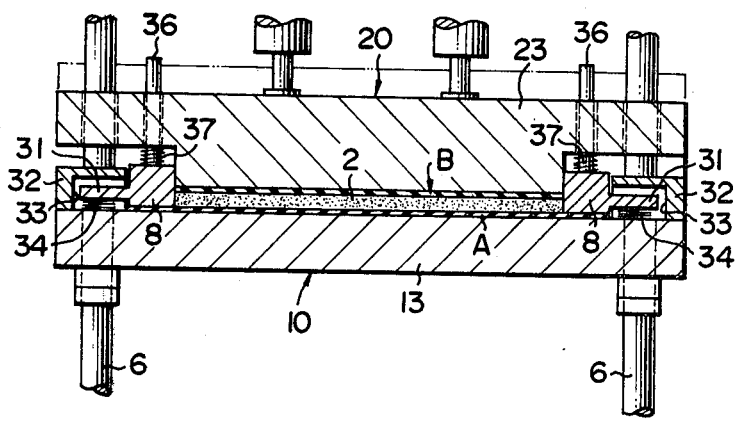
FIG. 8 is a view illustrating, on an enlarged scale, the pressed state.

Further, the side frame 8 has a guide rod 36 which projects upwards and which will be inserted in the hole of the moving board 20 so that it slidably moves up and down, while maintaining positioning relative to the side frame 8. Moreover, a spring 37 is fitted around the guide rod 36. Therefore, when the moving board 20 moves downwards, the side frame is downwardly urged via the spring 37 to come into contact with the lower steel belt A and is then pressed onto the fixed board 10 to close the gap 35 relative to the lower steel belt A (FIG. 8).

The blocks 21, 22, 23, 24 and 25 of the moving board 20 are fitted between the side frames 8, 8 to move sliding along the inner surfaces thereof (FIG. 3). Therefore, a pressing mold is established by the fixed board 10, moving board 20, and side frames 8, 8, with the steel belts A, B being interposed therein. When the moving board 20 is lowered, the resinous raw material 2 is compressed via the steel belt B.

Sets of the upper and lower corresponding blocks of the fixed board 10 and the moving board 20 constitute heating blocks, heat-insulating blocks and cooling blocks. That is, the blocks 11 and 21 form a first heating block $H_1$, the blocks 12 and 22 form a second heating block $H_2$, the blocks 13 and 23 form a heat-insulating block $H_3$, the blocks 14 and 24 form a first cooling block $C_1$, and the blocks 15 and 25 form a second cooling block $C_2$. The heating zone H consists of the first and second heating blocks $H_1$ and $H_2$, and the heat-insulating block $H_3$, and the cooling zone C consists of the first and second cooling blocks $C_1$ and $C_2$.

Blocks 11, 12, 13, 21, 22 and 23 of the heating zone H are equipped with heating means which are heated by a hot medium such as steam, high-temperature gas or oil or are electrically heated in order to heat the resinous starting material 2 to a predetermined temperature. Blocks 14, 15, 24 and 25 of the cooling zone C are equipped with cooling means which are cooled by a coolant such as water in order to cool the resinous starting material 2 to a predetermined temperature.

As the moving board 20 moves downwards, the blocks 21, 22 and 23 in the heating zone H press the resinous starting material 2 via the upper steel belt B, while the heating means of the upper and lower blocks 11, 12, 13, 21, 22 and 23 impart the heat to the resinous starting material 2 via the steel belts A and B. The first heating block $H_1$ in the heating zone H works to melt the resinous starting material 2. In the first heating block $H_1$, therefore, the pressing force and the heating temperature have been set to be greater than those of the second heating block $H_2$. The second heating block $H_2$ works to ripen the resinous starting material 2, and the heat-insulating block $H_3$ works to further ripen the starting material. In the heat-insulating block $H_3$, the pressing force and the heating temperature have been set to be smaller than the pressing force and the heating temperature of the second heating block $H_2$.

The cooling zone C works to harden the ripened resinous starting material 2.

The upper and lower steel belts A and B are stopped when the moving board 20 is raised, the steel belts A, B move by a distance of one block in order to transfer the resinous starting material 2 to the next block. The time in which the steel belts are at rest with the moving board 20 being lowered, i.e., the heating time or the cooling time in the zone H or C, is determined depending upon the thickness of the resinous starting material 2.

The thickness of the resinous starting material 2 is determined by the feeding rate from the hopper 1, i.e., determined by the doctor knife 3.

The resinous starting material 2 which is transferred between the two steel belts A and B, is compressed by the moving board 20, melted and ripened by the heating zone H, hardened by the cooling zone C, and is thus formed into a product 2' such as a thick synthetic resin plate or a thin synthetic resin sheet, and is delivered in an elongated form from between the two steel belts A and B. Using the above-mentioned apparatus, it is possible to obtain a synthetic resin sheet or plate 2' having a thickness ranging from 1 to 30 mm.

Using the above apparatus, a product 2' having a thickness of 10 mm is obtained under the below-mentioned conditions through the blocks $H_1$, $H_2$, $H_3$, $C_1$ and $C_2$ each having a length of 2 meters.

(1) When the resinous raw material is an ultrahigh molecular weight polyethylene:

|  | Pressing force (kg/cm$^2$) | Heating or cooling temperature (°C.) |
|---|---|---|
| First heating block $H_1$ | 75 | 240 |
| Second heating block $H_2$ | 50 | 220 |
| Heat-insulating block $H_3$ | 10 | 180 |
| First cooling block $C_1$ | 50 | 120 to 130 |
| Second cooling block $C_2$ | 75 | 50 to normal temperature |

The pressing time (heating or cooling time) is 7 minutes.

(2) When the resinous raw material is polyethylene or polypropylene:

|  | Pressing force (kg/cm$^2$) | Heating or cooling temperature (°C.) |
|---|---|---|
| First heating block $H_1$ | 75 | 240 |
| Second heating block $H_2$ | 30 | 220 |
| Heat-insulating block $H_3$ | 5 | 180 |
| First cooling block $C_1$ | 20 | 120 to 130 |
| Second cooling block $C_2$ | 50 | 50 to normal temperature |

The pressing time (heating or cooling time) is 5 minutes.

The above pressing force represents values exerted per unit sectional area of the resinous starting material.

The above apparatus is adapted for forming thermoplastic resins. If the cooling zone C is eliminated, the apparatus can be adapted for forming thermosetting resins such as phenolic resins or the like.

As an example of molding the thermosetting resin, a phenolic resin is molded under the following conditions (thickness of the product and the length of the blocks are the same as the above-mentioned examples).

|  | Pressing force (kg/cm$^2$) | Heating temperature (°C.) |
|---|---|---|
| First heating block $H_1$ | 75 | 180 |
| Second heating block $H_2$ | 50 | 170 |
| Heat-insulating block $H_3$ | 10 | 160 |

The pressing time (heating time) is 7 minutes.

In the above-mentioned examples, the upper and lower steel belts A and B are each composed of an endless belt. However, the lower steel belt A may be made up of two or three endless belt devices which are arrayed contiguous with each other, the endless belt devices running between the pulleys a' and b', i.e., the steel belt running across one or two of preforming zone, heating zone H and cooling zone C. Likewise, the upper steel belt B may be made up of two endless belt devices that run across the heating zone H and cooling zone C.

When the steel belts A, B are divided into a plurality of sections, the fixed board 10 and the moving board 20 are also divided into a corresponding number of sections.

FIGS. 9 to 11 illustrate modified embodiments according to the present invention.

In the embodiment of FIG. 9, a roller train 40 is brought into contact with the upper steel belt B in the vicinity of pulley b'. In further detail, the roller train 40 is brought into contact with a tapered portion of the lower side of the steel belt B being urged by hydraulic cylinders 41. The resinous starting material 2 conveyed between the steel belts A and B is gradually pressed and is deaerated by the roller train 40.

According to the embodiment of FIG. 10, the end portions of the blocks 21, 22, 23, 24 and 25 are formed in a tongued and grooved shape in such a manner that recessed portions 42 and protruded portions 43 of the neighboring blocks 21 and 22, 22 and 23, 23 and 24, 24 and 25 will engage with each other, and thus the end portions are fitted to each other.

The construction of FIG. 10 is to prevent the formation of steps on the surface of the resinous raw material 2 that results from gaps between the blocks 21, 22, 23, 24 and 25 when the pressing force is exerted by the moving board 20.

According to the embodiment of FIG. 11, an intermediate board 44 which is capable of moving in the upper and lower directions is interposed between the moving board 20 and the steel belt B such that, when the moving board 20 is lowered, the blocks 21 to 25 of the moving board 20 will come into contact with the steel belt B via the intermediate board 44. The intermediate board 44 consists of a single metal plate stretching over the whole lower surface of the blocks 21 to 25, and has a thickness greater than the steel belt B.

The intermediate board 44 works to reinforce the steel belt B under the moving board 20, and to prevent the development of defects that result from a multiplicity of blocks of the moving board 20 of the case of FIG. 10, i.e., to prevent the foramtion of steps on the surface of the resinous starting material 2 that result from gaps between the blocks 21 to 25.

By combining the constructions of FIGS. 10 and 11, the formation of steps can further be reliably prevented, and the quality of the product 2' can be improved.

As mentioned above, the present invention deals with an apparatus for forming an elongated synthetic resin plate or sheet by supplying a resinous starting material having a predetermined thickness between an upper steel belt and a lower steel belt, and heating the resinous starting material through the two steel belts while applying pressure, followed by cooling. A lower board is installed beneath the lower belt to constitute heating or cooling zones. An upper board is installed above the upper steel belt to constitute heating or cooling zones, and either one of the upper board or the lower board is permitted to move in the upper and lower directions, so that the resinous starting material is pressed by the pressing operation of the moving board via the upper and lower steel belts. Consequently, increased pressing force if exerted on the resinous starting material in the heating and cooling zones, and the heat conductivity is increased owing to increased contact area between the board and the steel belt. Therefore, the apparatus of the present invention is not limited to molding foaming materials only, but can be used for molding a variety of synthetic resin plates or sheets having large thickness to small thickness. Moreover, the quality of the molded products can be enhanced.

Further, side frames are installed on both the right and left sides of the lower steel belt, and the upper steel belt is arrayed between the two side frames to restrict the sides between the two steel belts. Accordingly, the resinous starting material which is melted in the heating zone does not flow sideways, making it possible to mold the product maintaining constant thickness without developing losses of starting materials and, further, making it possible to set the width of the product constant. Therefore, the operation of cutting selvage that is usually required to adjust the size in the subsequent steps is dispensed with and hence the operation efficiency can be improved.

We claim:

1. In an apparatus for forming an elongated synthetic resin plate or sheet by supplying a resinous starting material having a predetermined thickness to between an upper steel belt and a lower steel belt, and heating the resinous starting material through the two steel belts while applying pressure, followed by cooling, the improvement wherein said lower steel belt is placed on a lower board and is intermittently fed by a predetermined distance, side frames are installed on the lower steel belt, said side frames stretching on both the right and left edges of the lower steel belt in the lenghwise direction thereof, said upper steel belt is disposed between said two side frames, an upper board is installed on the upper steel belt, either one of the upper board or the lower board is so constructed as to move up and down, the resinous starting material is pressed by the pressing operation of the board which moves up and down via the upper and lower steel belts, and the upper and lower boards are divided into a plurality of blocks so as to correspond to the opposing ones, thereby to constitute heating zones having heating means and cooling zones having cooling means.

2. An apparatus for forming an elongated synthetic resin plate or sheet according to claim 1, wherein the lower steel belt has a starting end which protrudes sideways beyond the upper steel belt, and means for preheating the resinous starting material which is being fed is provided in said protruded portion to constitute a preforming zone.

3. An apparatus for forming an elongated synthetic resin plate or sheet according to claim 2, wherein a hopper for supplying the starting material is provided on the starting end of the lower steel belt so that the resinous starting material falls on the steel belt from said hopper.

4. An apparatus for forming an elongated synthetic resin plate or sheet according to any one of claims 1 to 3, wherein the lower steel belt consists of a single endless belt.

5. An apparatus for forming an elongated synthetic resin plate or sheet according to claim 2 or 3, wherein the lower steel belt consists of two endless belts that are arrayed contiguous with each other thereby to form a preforming zone, a heating zone and a cooling zone.

6. An apparatus for forming an elongated synthetic resin plate or sheet according to claim 2 or 3, wherein the lower steel belt consists of three endless belts that are arrayed contiguous with each other thereby to form a preforming zone, a heating zone and a cooling zone.

7. An apparatus for forming an elongated synthetic resin plate or sheet according to claim 4, wherein the upper steel belt consists of a single endless belt.

8. An apparatus for forming an elongated synthetic resin plate or sheet according to claim 4, wherein the upper steel belt consists of two endless belts that are arrayed contiguous with each other thereby to form a heating zone and a cooling zone.

9. An apparatus for forming an elongated synthetic resin plate or sheet according to claim 1, wherein the heating zone consists of a plurality of blocks which apply different pressures and different heating temperatures.

10. An apparatus for forming an elongated synthetic resin plate or sheet according to claim 9, wherein said heating zone includes a heat-insulating block.

11. An apparatus for forming an elongated synthetic resin plate or sheet according to claim 1, wherein said cooling zone consists of a plurality of blocks which apply different pressures and different cooling temperatures.

12. An apparatus for forming an elongated synthetic resin plate or sheet according to any one of claim 9, 10 or 11, wherein a suitable gap is formed among each of the blocks of said heating and cooling zones.

13. An apparatus for forming an elongated synthetic resin plate or sheet according to claim 1, wherein the upper steel belt is intermittently fed in synchronism with the lower steel belt.

14. An apparatus for forming an elongated synthetic resin plate or sheet according to claim 1, wherein said moving board moves up and down in sliding contact with the inner surfaces of the right and left side frames at least in the heating zone.

15. An apparatus for forming an elongated synthetic resin plate or sheet according to claim 14, wherein the upper steel belt has a width which is slightly smaller than the distance between the right and left side frames.

16. An apparatus for forming an elongated synthetic resin plate or sheet according to claim 14 or 15, wherein the right and left side frames are installed on the side steel belt via upwardly urging springs maintaining a small gap so as to move in the up and down directions, and when the moving board initiates its moving operation, the right and left side frames are downwardly moved prior to exerting pressure on the resinous starting material, and are pressed onto the lower board via the lower steel belt.

17. An apparatus for forming an elongated synthetic resin plate or sheet according to claim 1, wherein the neighboring portions of a plurality of blocks forming the upper board are formed in a tongued and grooved shape, such that the recessed portions and the protruding portions of the opposing blocks will fit to each other.

18. An apparatus for forming an elongated synthetic resin plate or sheet according to claim 7, wherein an intermediate board consisting of a single plate is interposed under the whole length of the plurality of blocks that form the upper board.

19. An apparatus for forming an elongated synthetic resin plate or sheet according to claim 8, wherein the intermediate board consists of a metal plate having a thickness greater than that of the steel belts.

20. An apparatus for forming an elongated synthetic resin plate or sheet according to claim 1, wherein a train of rollers is provided at the starting end of the upper steel belt to downwardly urge the upper steel belt, and the resinous starting material fed by the train of rollers is gradually compressed and is deaerated.

21. An apparatus for forming an elongated synthetic resin plate or sheet according to claim 1, wherein said resinous starting material is a thermoplastic resin.

22. An apparatus for forming an elongated synthetic resin plate or sheet according to claim 1, wherein the cooling zone is eliminated so that the thermosetting resins can be molded.

* * * * *